United States Patent
Otaki et al.

(10) Patent No.: US 10,502,611 B2
(45) Date of Patent: *Dec. 10, 2019

(54) CALIBRATION APPARATUS

(71) Applicant: Tatsuno Corporation, Tokyo (JP)

(72) Inventors: Tsutomu Otaki, Tokyo (JP); Norikazu Osawa, Tokyo (JP)

(73) Assignee: TATSUNO CORPORATION, Tokyo (JP)

( * ) Notice: Subject to any disclaimer, the term of this patent is extended or adjusted under 35 U.S.C. 154(b) by 18 days.

This patent is subject to a terminal disclaimer.

(21) Appl. No.: 15/273,313

(22) Filed: Sep. 22, 2016

(65) Prior Publication Data
US 2017/0089752 A1    Mar. 30, 2017

(30) Foreign Application Priority Data

Sep. 28, 2015 (JP) .................................. 2015-189387

(51) Int. Cl.
*G01F 25/00* (2006.01)
*G01G 17/04* (2006.01)

(52) U.S. Cl.
CPC ...... *G01F 25/0046* (2013.01); *G01F 25/0053* (2013.01); *G01G 17/04* (2013.01)

(58) Field of Classification Search
CPC .................................................. G01G 13/14
See application file for complete search history.

(56) References Cited

U.S. PATENT DOCUMENTS

| 5,913,344 A * | 6/1999 | Wronski | F17C 5/005 141/4 |
|---|---|---|---|
| 2002/0014275 A1 | 2/2002 | Blatt | |
| 2010/0206098 A1* | 8/2010 | Wilby | G01G 9/00 73/865 |
| 2015/0060155 A1* | 3/2015 | Michaluk, III | G01G 17/04 177/25.12 |
| 2016/0033085 A1* | 2/2016 | Sirosh | F17C 13/12 137/2 |

FOREIGN PATENT DOCUMENTS

| CN | 102401235 | | 4/2012 | |
|---|---|---|---|---|
| CN | 102401235 A | * | 4/2012 | |
| DE | 102011053843 | | 3/2013 | |
| FR | 1518935 | | 3/1968 | |
| FR | 1518935 A | * | 3/1968 | ............. F17C 5/005 |
| WO | WO2015082505 | | 6/2015 | |

OTHER PUBLICATIONS

European Patent Office, European Search Report, dated Apr. 21, 2017, 8 pages, Munich, Germany.

* cited by examiner

*Primary Examiner* — Herbert K Roberts
(74) *Attorney, Agent, or Firm* — Stetina Brunda Garred and Brucker; Mark B. Garred

(57) ABSTRACT

To provide a calibration device for apparatus filling a gas such as hydrogen gas and capable of precisely measuring quantity of the gas such as hydrogen gas that are filled at high pressure. A calibration device 100 according to the present invention includes a measurement housing 10 accommodating a filling vessel 2 to which a high pressure fuel gas is fed from outside; a scale 3 for measuring a weight of a fuel gas fed to the filling vessel 2; and a main body housing 10 accommodating the measurement housing 1 and the scale 3.

11 Claims, 2 Drawing Sheets

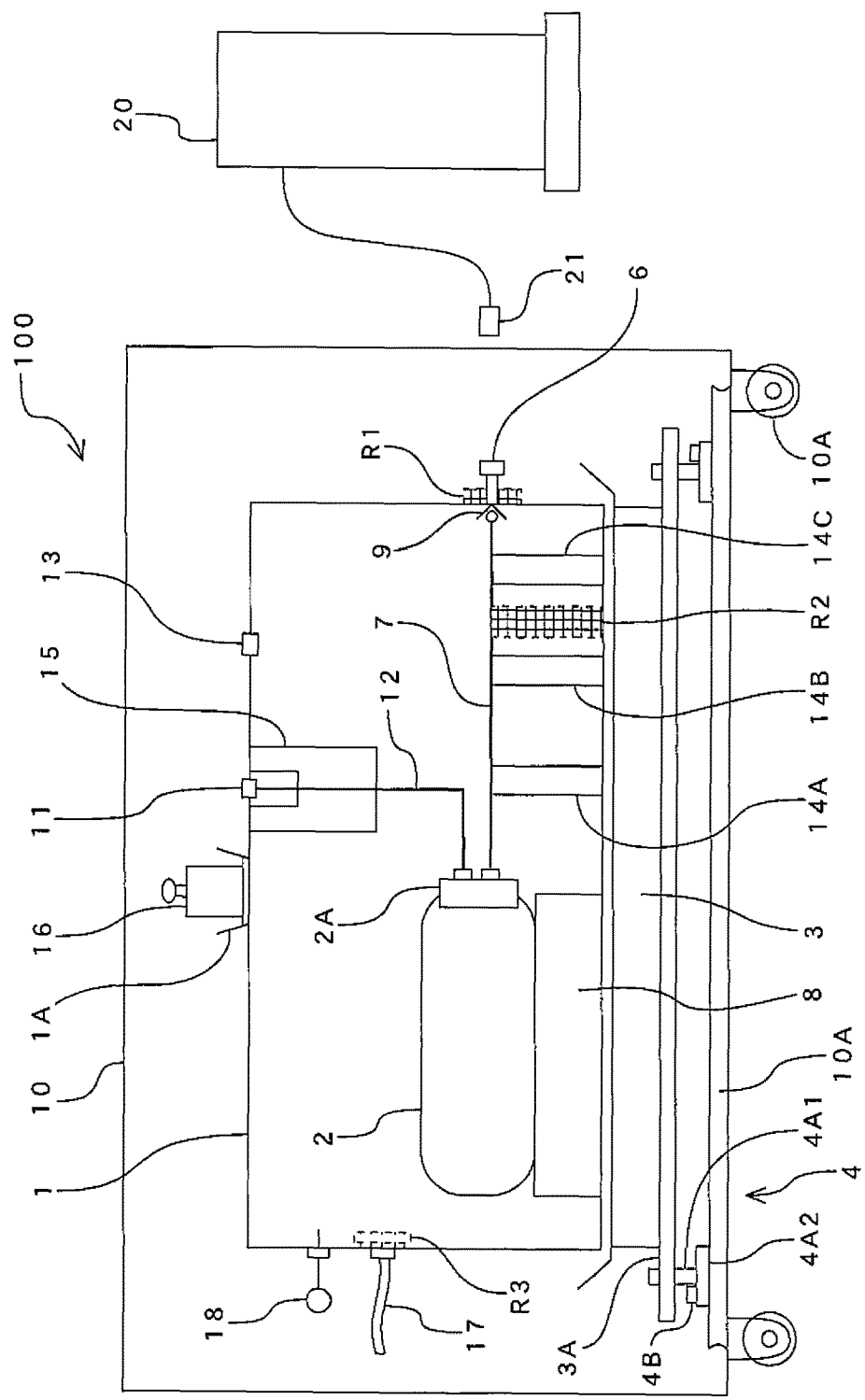
[Fig. 1]

[Fig. 2]
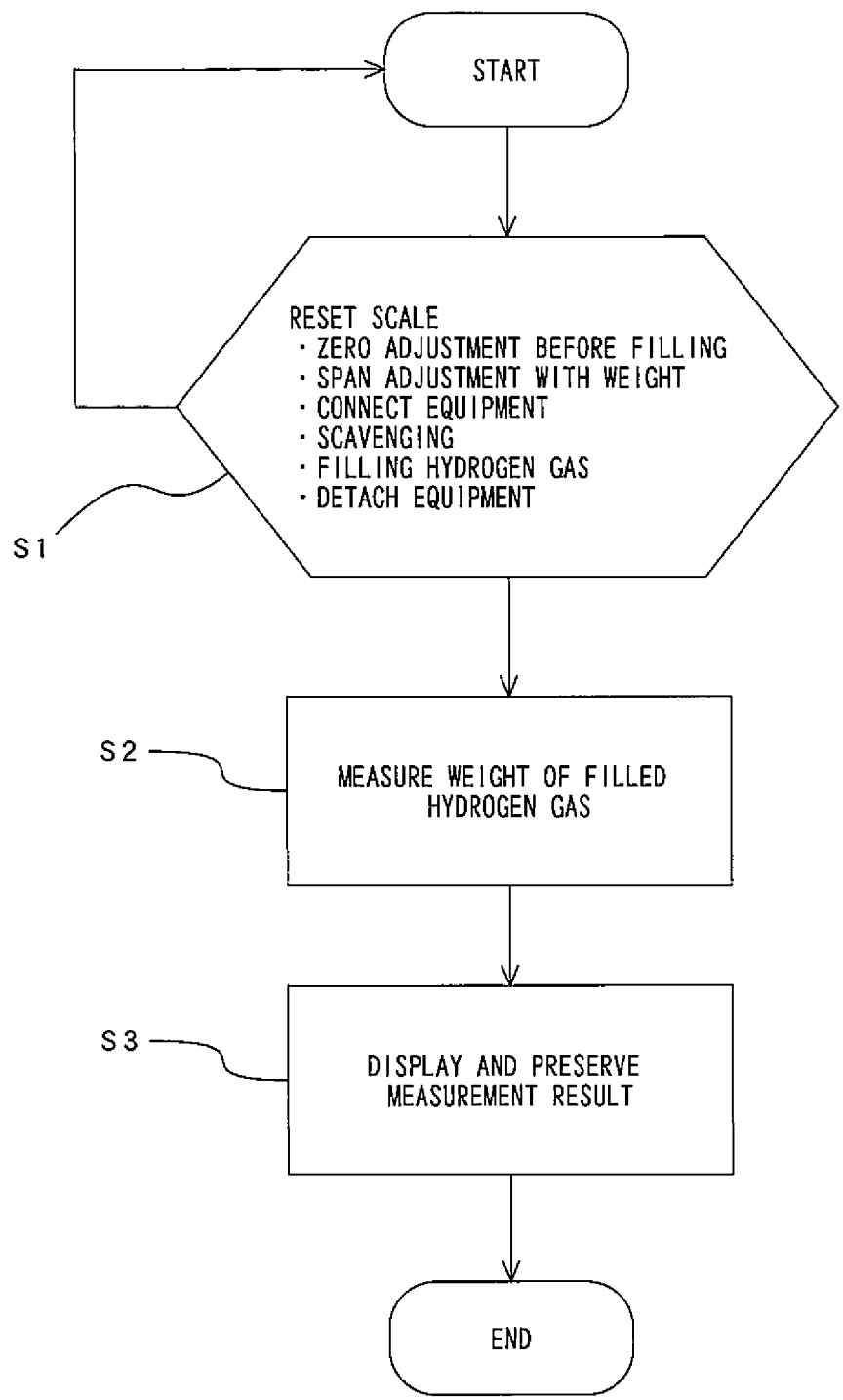

CALIBRATION APPARATUS

CROSS-REFERENCE TO RELATED APPLICATIONS

The present application claims priority to Japanese Patent Application No. 2015-189387 filed on Sep. 28, 2015, the disclosure of which is incorporated herein by reference.

STATEMENT RE: FEDERALLY SPONSORED RESEARCH/DEVELOPMENT

Not Applicable

BACKGROUND OF THE INVENTION

1. Field of the Invention

The present invention relates to a calibration device for apparatus for filling a gas such as hydrogen gas, and more particularly to a calibration device capable of precisely measuring quantity of a gas such as hydrogen gas filled at high pressure.

2. Description of the Related Art

Gas meters installed in gas stations are obliged to take flow rate verification every seven years to maintain fair business dealing, and it is requested that instrumental error of the flow meter is within ±0.5 percent. To such request, the applicant proposes a gas meter with inspection mechanism of flow meters in the Japanese Patent Publication No. Heisei 07-33197.

In recent years, as a countermeasure for environmental issue, fuel-cell automobiles using hydrogen as fuel have been developed, accordingly hydrogen filling apparatus and calibration devices for the hydrogen filling apparatus have been investigated.

Here, when the calibration device includes a scale for measuring weights of equipment such as a filling vessel and filling pipes out of doors, there is a possibility, for example, that the results of the weight measurements by the scale fluctuate due to effects of wind and rain. In addition, when atmospheric temperature or ambient temperature changes, the measurement results by the scale fluctuate. Therefore, there is a problem that accurate measurement is difficult since measurement accuracy falls out of doors due to wind, rain and atmospheric temperature change.

The contents of Japanese Patent Publication No. Heisei 07-33197 is incorporated herein by reference in its entirety.

SUMMARY OF THE INVENTION

The present invention has been made in consideration of the above problems in conventional arts, and the object thereof is to provide a calibration device for a filling apparatus for a gas such as hydrogen gas and capable of precisely measuring quantity of the gas such as hydrogen gas that is filled at high pressure without being affected by ambient environment.

The calibration device 100 according to the present invention is characterized by including: a measurement housing 1 accommodating a filling vessel 2 to which a high pressure fuel gas such as hydrogen gas is fed from outside; a scale 3 for measuring a weight of a fuel gas fed to the filling vessel 2; and a main body housing 10 accommodating the measurement housing 1 and the scale 3.

In the present invention, it is preferable that equipment, accommodated in the measurement housing 1, such as the filling vessel 2, the filling gas feeding pipe 7 and a filling gas discharging pipe 12 are mounted in the measurement housing 1 through a member with heat insulating property, a portion of which is a member with low heat conductivity such as rubber and resin.

In addition, in the present invention, it is preferable that at an upper portion of the measurement housing 1 is formed a weight mounting portion 1A for mounting a weight 16.

Further, when the present invention is carried out, it is preferable that the dry gas pipe 17 for feeding a dry gas in the measurement housing is detachably mounted to the measurement housing 1.

When the present invention is carried out, it is preferable that after the calibration device 100 is installed, a scaffold on which the scale is mounted is not fixed, which is so-called a free condition.

Then, before and after filling, the filling nozzle 21, pipes such as the dry gas pipe 17 and various sensors are preferably detached to measure weight of the calibration device 100.

With the present invention with the above construction, the measurement housing 1 accommodating the filling vessel 2, and the scale 3 exist in the main body housing 10, so that at weight measurements, the measurement housing 1 and the scale 3 can be blocked from wind, rain and direct sun shine, which prevents sudden changes in temperature in the measurement housing 1 and the scale 3, and maintains measurement accuracy of the scale 3.

As a result, without being effected by wind, rain, direct sun shine and temperature changes, accurate measurements become possible. Here, it takes approximately several minutes to fill hydrogen and so on to the filling vessel and perform calibration, in the meantime, avoiding effects of wind, rain and direct sun shine allows sufficiently accurate measurements. Therefore, blocking wind, rain and direct sun shine by the main body housing 10 is considerably effective on improvement in measurement accuracy.

At the calibration, hydrogen, which has been cooled at −40° C., is filled in the filling vessel 2 to shorten filling time, which decreases temperatures of equipment directly contacting with the hydrogen such as the filling vessel 2, the filling gas feeding pipe 7, the filling gas discharging pipe 12 and so on accommodated in the measurement housing 1 in comparison to ambient temperature to condense dew thereon, and there is a possibility that the measurement accuracy is decreased. But, in the present invention, equipment accommodated in the measurement housing 1 such as the filling vessel 2, the filling gas feeding pipe 7 and the filling gas discharging pipe 12 can be mounted through a member with heat insulating property, a portion of which is a member with low heat conductivity such as rubber and resin to the measurement housing 1, so that it is prevented that influence by fuel gas such as the hydrogen gas at low temperature filled in the measurement housing 1, and dew condensed reach around the filling vessel 2, the filling gas feeding pipe 7 and the filling gas discharging pipe 12, which enables the weight measurements with high accuracy.

Particularly, when by the influence of the fuel gas at low temperature such as the hydrogen gas, which has been cooled at −40° C., the scale becomes low temperature also, the accurate measurements are disturbed. But, the influence by low temperature fuel gas such as the hydrogen gas, which has been cooled at −40° C., and dew condensed are not transmitted to the scale 3 through a member with heat insulating property, a portion of which is a member with low heat conductivity such as rubber and resin, so that measurement accuracy of the scale 3 is secured.

In the present invention, forming a weight mounting portion 1A for mounting a weight 16 at an upper portion of the measurement housing 1 allows a span adjustment that is an adjustment of variation range of the scale 3 to be performed by mounting a weight 16 satisfying traceability of measurements on the weight mounting portion 1A every time a weight of the filled gas is measured or a measurement position changes.

With the above span adjustment, even when a position where the calibration device is installed changes, or there are influences of changes of temperature characteristic of the scale 3 due to change of the measurement position such as altitude and latitude, and fluctuations of temperature and atmospheric pressure at the calibration device, and changes of stresses due to changes of weight, heat expansion or heat contraction of a gas in the measurement housing 1, these influences are eliminated by the span adjustment and weight measurements with high accuracy can be performed with the scale 3.

Here, when a weight of the filled gas is measured, a weight of the fuel gas such as hydrogen gas filled in the measurement housing 1, which is 5 kg for instance, is much lighter than that of the measurement housing accommodating various parts, which is 400 kg for instance.

Therefore, the measurement housing 1 accommodating the filling vessel 2, the filling gas feeding pipe 7 and so on is mounted on the scale 3 to perform zero adjustment, and at that time, the weight 16 satisfying the traceability of measurements is mounted on the measurement housing 1 to perform the span adjustment of the scale 3, which can secure necessary and sufficient accuracy of each measurement.

Further when the present invention is carried out, detachably mounting the dry gas pipe 17 for feeding the dry gas in the measurement housing 1 to the measurement housing 1 can fill the dry gas through the dry gas pipe 17 in the measurement housing 1. Then, filling the dry gas in the measurement housing 1 allows air and other gases with moisture to be discharged.

As a result, even when hydrogen gas, which has been cooled at −40° C. for instance, as the fuel gas is fed to the filling vessel 2 in the calibration device 100, it is prevented that dew condenses on the equipment in the measurement housing 1, which can suppress reduction in the measurement accuracy due to the dew condensation.

In addition, when it can be prevented that dew condenses on the equipment in the measurement housing 1, it becomes unnecessary that the weight measurements stand by until the dew-condensed pipes are dried, so that continuous calibrations can be performed.

Here, the dry gas pipe 17 can be detachably mounted to the measurement housing 1, which prevents that at the weight measurement with the scale 3, the dry gas pipe 17 is separated from the measurement housing 1, and it is prevented that stresses generating in the dry gas pipe vary results of weight measurements by the scale 3.

BRIEF DESCRIPTION OF THE DRAWINGS

FIG. 1 is a block diagram showing an embodiment of the present invention; and FIG. 2 is a flow chart showing the procedure of a calibration according to the embodiment.

DETAILED DESCRIPTION

Next, an embodiment of the present invention will be explained with reference to FIGS. 1 and 2.

In FIG. 1, a calibration device according to the embodiment of the present invention is totally shown by a numeral character 100. The calibration device 100 is provided with: a measurement housing 1, a filling vessel 2, accommodated in the measurement housing 1, to the filling vessel 2 a high pressure fuel gas such as hydrogen gas being fed from outside of the measurement housing 1; a scale 3 for measuring the weight of the fuel gas such as hydrogen gas fed to the filling vessel 2; and a main body housing 10 for accommodating the measurement housing 1 and the scale 3. The filling vessel 2 is mounted on a bottom face of the measurement housing 1 through a supporting member 8.

Hereinafter, the explanation will be made when hydrogen gas is adopted as a fuel gas.

The weights of the measurement housing 1 before and after filling hydrogen gas are measured by the scale 3, and the weight of the hydrogen gas fed to and filled in the filling vessel 2 is calculated from the difference between the both weights. And, in the following mode shown in FIG. 2, a zero adjustment and a span adjustment, that is, an adjustment of variation range of the scale 3, are performed to measure the weights of the measurement housing 1 before and after filling hydrogen gas.

In FIG. 1, the measurement housing 1 accommodating the filling vessel 2 and so on, and the scale 3 are accommodated in the main body housing 10, and the main body housing 10 has moving means 10A such as wheels on its bottom face, and can move near a position at a calibration where a hydrogen filling apparatus 20 to be calibrated is installed.

On a side face of the measurement housing 1 is mounted a receptacle 6 as a hydrogen reception port, and when hydrogen gas is fed to and filled in the filling vessel 2 in the measurement housing 1 from the hydrogen filling apparatus 20 to be calibrated, the receptacle 6 becomes the hydrogen reception port on the side of the measurement housing 1.

When hydrogen gas is filled in the filling vessel 2 for calibration, the hydrogen filling apparatus 20 and the measurement housing 1 are connected by the coupling of the filling nozzle 21 and the receptacle 6, and the hydrogen gas is fed from the hydrogen filling apparatus 20 to the filling vessel 2 in the measurement housing 1.

In the measurement housing 1, the receptacle 6 and the filling vessel 2 are connected through a filling gas supply pipe 7. The hydrogen gas fed from the hydrogen filling apparatus 20 is filled from the receptacle 6 through the filling gas supply pipe 7 in the filling vessel 2.

In FIG. 1, the numeral 2A indicates a filling gas intake portion in the filling vessel 2, and the numeral 9 is a check valve, mounted on the filling gas supply pipe 7, for preventing backflow of the hydrogen gas. In addition, mounting a flowmeter not shown on the filling gas supply pipe 7 enables real-time monitoring of the filled hydrogen gas, and excessive flow rate or abnormal instantaneous flow rate of the hydrogen gas flowing in the filling gas supply pipe 7 can be detected, which ensures performance and safety of the calibration device 100.

On the upper face of the measurement housing 1 is mounted a filling gas outlet 11, which is connected to the filling vessel 2 through a filling gas release pipe 12. Here, not shown in the drawings, the main body housing 10 includes a gas release mechanism also.

In case that the hydrogen gas is discharged from the filling vessel 2, the hydrogen gas discharged from the filling vessel 2 is discharged through the filling gas release pipe 12 from the filling gas outlet 11 to outside of the measurement housing 1, and the hydrogen gas discharged from the measurement housing 1 is discharged through the gas release mechanism not shown outside the main body housing 10.

On the upper face of the measurement housing 1 is mounted a gas outlet 13. When dry gas or inert gas is filled in the measurement housing 1, air and other gases with moisture in the measurement housing 1 are discharged through the gas discharging port 13 outside the measurement housing 1.

In FIG. 1, the filling gas supply pipe 7 is fixed to a bottom face portion of the measurement housing 1 by the supporting members 14A-14C. In addition, the filling gas release pipe 12 is fixed to the upper face portion of the measurement housing 1 by a supporting member 15.

As constructions that by the supporting members 14, the supporting member 15 and the supporting member 8 are respectively fixed the filling gas supply pipe 7, the filling gas release pipe 12 and the filling vessel 2 to the measurement housing 1, various conventional prior constructions can be utilized.

Here, the supporting members 14, 15 and 8 are formed of members with heat insulating properties, which have low heat conductivity such as rubber and resin.

At the calibration, when the hydrogen gas, which has been cooled at −40° C. for instance, is filled in the filling vessel 2, equipment that directly contacts with the hydrogen gas such as the filling vessel 2, the filling gas supply pipe 7 and the filling gas release pipe 12 become low in temperature in comparison to ambient temperature to condense dew thereon.

But, since the filling vessel 2, the filling gas supply pipe 7 and the filling gas release pipe 12 are fixed or disposed to the measurement housing 1 through the supporting members 14, 15 and 8 that are formed of members with heat insulating property, a portion of which is a member with low heat conductivity such as rubber and resin, low temperatures affected by the hydrogen gas are shut off by the supporting members 14, 15 and 8, which prevents temperatures of other parts such as the measurement housing 1 and the scale 3 from becoming low, and prevents dew from condensing thereon. In other words, mounting the supporting members 14, 15 and 8 that are formed of members with heat insulating property, a portion of which is a member with low heat conductivity such as rubber and resin prevents that the low temperature of the hydrogen gas that is at −40° C. effects on the scale 3, and dew condenses on the outer faces of the measurement housing 1 and the scale 3.

In FIG. 1, on the upper face of the measurement housing 1 above and near the center portion of the scale 3 is formed a weight mounting portion 1A on which a weight 16 for performing a span adjustment is mounted.

The weight measurements through the scale 3 in the embodiment shown in the drawings are easily influenced by changes of temperature, ambient pressure and the like, and are influenced by change of acceleration of gravity generated by changing altitude and latitude of the measurement position also. But, the calibration device 100 according to the embodiment shown in the drawings performs a span adjustment that is an adjustment of variation range by mounting the weight 16 satisfying the traceability of measurements on the weight mounting portion 1A every time the weight of the filled gas is measured or the measuring position varies. With this, even when changes of temperature, ambient pressure and altitude and latitude of the measurement position exist, eliminating the effects thereby enables the weight measurements with high accuracy through the scale 3.

When the weight of the filling gas is measured at the calibration, before the filling gas is filled in the filling vessel 2, the measurement housing 1 accommodating the filling vessel 2, the filling gas feeding pipe 7 and the like is mounted on the scale 3, and a zero adjustment of the scale 3 is performed, after that, on the weight mounting portion 1A of the measurement housing 1 is mounted the weight 16 to perform the span adjustment that is the adjustment of variation range of the scale 3.

Here, the weight of the measurement housing 1 accommodating the filling vessel 2, the filling gas feeding pipe 7 and the like before the filling gas is filled is approximately 400 kg, on the other hand, the weight of hydrogen gas to be filled in the measurement housing 1, which is weight change of the measurement housing 1 by the hydrogen filling, is approximately 5 kg, which is much lighter than that of the measurement housing 1. Therefore, after the zero adjustment is performed under the condition that the measurement housing 1 whose weight is approximately 400 kg is mounted on the scale 3, performing the span adjustment that is an adjustment of variation range under the condition that the weight satisfying the traceability of measurements whose weight is 5 kg for instance is mounted on the scale 3 can secure necessary and sufficiently measurement accuracy for the weight measurements of the filled gas.

In FIG. 1, on the side face of the measurement housing 1 is detachably mounted a dry gas pipe 17 for feeding dry gas in the measurement housing 1. The dry gas is fed to and filled in the measurement housing 1 from a supply resource not shown through the dry gas pipe 17. Under the condition that the dry gas is filled in the measurement housing 1, even when the hydrogen gas, which has been cooled at −40° C. for instance, is fed to the filling vessel 2, amount of dew condensing on each part in the measurement housing 1 is few, and the amount hardly effects on the weight measurements.

Here, as the dry gas can be utilized inert gas such as nitrogen, argon and helium, carbon dioxide, and dried air. And, as the dry gas can be adapted any gases that can be obtained at low cost; easily filled into or discharged from the measurement housings 1, 10 for a short period of time; and has a characteristic contributing to improvement of safety.

Further, on the side face of the measurement housing 1 is mounted a dew-point instrument 18. Based on the measured results of the dew-point instrument 18, proper humidity management is performed in the measurement housing 1.

Here, it is expected that decreasing the dew point to −40° C. or less for instance causes the amount of the condensing dew to become zero, but the difference between the amount at −40° C. or less and that at −20° C. or less is small. Therefore, it is realistic and economical that the dew-point temperature is set from −20° C. to −25° C. as a reference dew-point temperature that can be judged to be necessarily and sufficiently dried. In the embodiment shown in the drawings, the dew-point instrument 18 is mounted outside of the measurement housing 1, but can be mounted inside the measurement housing 1.

Further, a control device not shown for transmitting measured values by the dew-point instrument 18 via infrared communication to the hydrogen filling apparatus 40 can be arranged to the dew-point instrument 18, which can control, with a simple construction, the hydrogen filling apparatus 40 so as to start the filling when the dew-point temperature in the measurement housing 1 reaches the predetermined temperature.

Not shown in the drawings clearly, but the measurement housing 1 is semi-enclosed structure. Here, "semi-enclosed structure" means a structure realizing not perfectly sealed state, but nearly sealed state.

When the measurement housing 1 is semi-enclosed structure, feeding the dry gas in the measurement housing 1 makes the inner part of the measurement housing 1 slightly pressurized, so that it is prevented that air with moisture enters into the measurement housing 1.

In FIG. 1, the scale 3 is mounted on the bottom face of the main body housing 10 through the mounting members 4. The mounting members 4 are provided with foot portions 4A for supporting a scale pedestal portion 3A of the scale 3, and a lock mechanisms 4B for fixing the foot portions 4A to the bottom portion 10A of the main body housing 10

In order to support the scale pedestal portion 3A that is a flat-plate-shaped, the foot portion 4A are mounted to each corner of the scale pedestal portion 3A, that is, totally four foot portions 4A are mounted. A vertical members 4A1 configuring the foot portions 4A penetrate the scale pedestal portion 3A and are extended upward, and the scale pedestal portion 3A is fixed to the vertical members 4A1 with conventional manners.

The lock mechanisms 4B are composed of fasting members such as volts, and are mounted on the bottom portions 4A2 of the foot portions 4A. The lock mechanisms 4B fix the foot portions 4A to the bottom portion 10A of the main body housing 10, and have functions for releasing the fixations of the foot portions 4A to the bottom portion 10A.

When the calibration device 100 moves, in order to prevent that the scale 3 moves to collide with the main body housing 10, through the lock mechanisms 4B are fixed the foot portions 4A to the bottom portion 10A, and the scale 3 on which the measurement housing 1 is mounted is surely fixed to the main body housing 10. When the calibration device 100 is stored also, in order to prevent that the scale 3 moves to collide with other members, the lock mechanisms 4B is locked.

On the other hand, when the weight of the filled gas is measured, fixing the mounting members 4 to the main body housing 10 to fix the scale 3 to the main body housing 10 transmits deflection or distortion of the main body housing 10, and heat expansion or heat shrinkage due to temperature change in to the scale 3 through the mounting members 4, and there is a possibility that an error occurs in the results of the weight measurements. Therefore, at the weight measurements, the fixations of the lock mechanisms 4B are released, which becomes a condition that the mounting members 4 are not fixed to the main body housing 10, so-called a free condition, and the scale 3 is set free from the main body housing 10.

When the weight measurements are performed at the calibration, connecting the filling nozzle 21, the dry gas pipe 17 and various sensors not shown to the measurement housing 1 transmits stresses generated in the filling nozzle 21, the dry gas pipe 17 and the sensors to the scale 3, and there is a possibility that the stresses effect on the measurement results of the scale 3. In order to eliminate the possibility, when the weight measurements are performed at the calibration, the filling nozzle 21, the dry gas pipe 17 and the sensors to the scale 3 connected to the measurement housing 1 are separated from the measurement housing 1. When the weight of the measurement housing 1 is measured, the dew-point instrument 18 can be separated from the measurement housing 1 also.

However, when the weight measurements are performed at the calibration, if adverse effects are not given on the measurements through the scale 3 so as not to transmits stresses generated in the filling nozzle 21, the dry gas pipe 17 and the sensors to the scale 3, the filling nozzle 21, the dry gas pipe 17 and the various sensors can be connected to the measurement housing 1. In such a case, the dry gas pipe 17 and the various sensors are firmly fixed to a connecting portion near the measurement housing 1 so as not to transmit deformations or stresses to the measurement housing 1.

Under the condition that the filling nozzle 21, the dry gas pipe 17, and the various sensors are connected to the measurement housing 1, performing the measurements through the scale 3 allows complicated works such as attaching and detaching of the dry gas pipe 17 and the filling nozzle 21 to be omitted. Then, when the various sensors are connected at the weight measurements, weight monitoring becomes possible to perform safety and detailed measurements.

Next, a procedure of calibration using the calibration device 100 shown in FIG. 1 will be explained while referring to a flowchart shown in FIG. 2.

In the FIG. 2, in the step S1 is performed scale reset. Not shown in FIG. 2 clearly, but when the main body housing 10 accommodating the measurement housing 1, the scale 3 and the like is moved to a calibration position, the lock mechanisms 4B of the mounting members 4 are released, which makes the scale 3 free state from the main body housing 10.

In the scale reset, at first, zero adjustment before filling and span adjustment that is adjustment of variation range with the weight 16 are performed, then the dry gas pipe 17 is connected to the filling nozzle 21 as an equipment connecting work, and air and other gases with moisture in the measurement housing 1 is discharged as a scavenging work. Further, the hydrogen gas is filled from the hydrogen filling apparatus 20 to be calibrated to the filling vessel 2 as a filling work, and then the dry gas pipe 17 is detached from the filling nozzle 21 as a detaching work.

In the zero adjustment before filling in the step S1, the measurement housing 1 accommodating the filling vessel 2 and so on, to which the dry gas pipe 17, the filling nozzle 21 and so on are not connected, is mounted on the scale 3 to perform the weight measurement and the zero adjustment.

Next, in the span adjustment with the weight 16, the weight 16 satisfying traceability of measurements is mounted on the weight mounting portion 1A of the measurement housing 1 to perform the span adjustment that is adjustment of variation range.

In the equipment connecting work in the step S1, to the side face of the measurement housing 1 is connected the dry gas pipe 17. Then, to the receptacle 6 mounted on the side face of the measurement housing 1 is connected the filling nozzle 21 of the hydrogen filling apparatus 20.

In the scavenging work in the step S1, a dry gas is fed to and filled in the measurement housing 1 from a dry gas supply resource not shown through the dry gas pipe 17. Filling the dry gas in the measurement housing 1 discharges gases with moisture such as air existing in the measurement housing 1 from the gas discharging port 13 outside the measurement housing 1, and the gases are discharged from a gas discharging mechanism not shown outside the main body housing 10.

At the scavenging work in the step S1, the measured values by the dew-point instrument 18 are monitored at any time. The dew-point temperature gradually decreases as the scavenging progresses, and the humidity in the measurement housing 1 decreases. Then, when the dew-point temperature in the measurement housing 1 is a prescribed temperature, which is −20° C. for instance, that is a dew-point temperature that can be judged it is sufficiently dried in the measurement housing 1, and for example, hydrogen gas that is cooled at −40° C., is fed, amount of dew condensing on the receptacle 6, the filling gas supply pipe 7, the filling vessel 2 and other parts becomes few, so that the amount hardly effects on the weight measurements.

In other words, when the dew-point temperature reaches the predetermined temperature, which is −20° C. for instance, it is sufficiently dried in the measurement housing 1, and even when the hydrogen gas, which has cooled at the −40° C. for instance is filled in the filling vessel 2 in the measurement housing 1, amount of dew condensing on the filling vessel 2, the receptacle 6, the filling gas feeding pipe 7 and other parts is few, and the amount hardly effects on the weight measurements. Under the condition, the filling work in the step S1 is performed. The filling of the hydrogen gas is performed until a pressure gauge not shown of the hydrogen filling apparatus 20 judges that predetermined amount of hydrogen gas is fed.

After the filling work, the detaching work in the step S1 is performed.

In the detaching work, the dry gas pipe 17 is detached form the filling nozzle 21. Detaching the dry gas pipe 17 from the measurement housing 1, at the weight measurement in the step S2, removes effect of stress generated in the dry gas pipe 17 from the measurements with the scale 3, and it is prevented that the stress varies the results of the weight measurements. But, as described above, the weight measurements with the scale 3 can be performed under the condition that the filling nozzle 21, the dry gas pipe 17 and various sensors not shown are connected to the measurement housing 1. In such a case, the detaching works are omitted in the step S1 and in the flowing step S2.

When the step S1 is finished the procedure moves to the step S2.

In the step S2, with the scale 3 is measured the weight of the measurement housing 1 after hydrogen gas is filled in the filling vessel 2 of the measurement housing 1 from the hydrogen filling apparatus 20.

In the embodiment shown in the drawings, after the filling of the hydrogen gas, it is prevented that dew condenses on the surfaces of equipment in the measurement housing 1, which eliminates errors due to dew condensation to perform accurate weight measurements.

In addition, the measurement housing 1 is mounted on the scale 3 to perform the zero adjustment, and the weight 16 satisfying the traceability of measurements is mounted on the scale 3 to perform the span adjustment, which is adjustment of variation range, so that necessary and sufficient accuracy is secured in the weight measurements with the scale 3.

Then, from the difference between before and after the filling the hydrogen gas and in a conventional manner is calculated the filled amount of the hydrogen gas. Comparing the calculated filled amount with the filled amount measured in the hydrogen filling apparatus 20 to be calibrated, calibrates the hydrogen filling apparatus 20.

In the next step S3, the weight of the hydrogen gas that is measurement result in the step S2, the filled amount of the hydrogen gas, and calibration result are displayed on a display not shown.

Further, the filling amount of the hydrogen gas is stored in a memorizing device of an information processor such as a PC not shown together with an identification number such as a product number of the hydrogen filling apparatus 20 to be calibrated, and day and time performing the calibration. Then, the calibration procedure is finished.

Not shown clearly in FIG. 2, but, in case that the calibrations for the hydrogen filling apparatus 20 are continuously performed by the calibration device 100, after the step S3, the hydrogen gas filled in the filling vessel 2 is discharged outside of the measurement housing 1 and the main body housing 10 through the filling gas release pipe 12 and the filling gas discharging port 11. Then, the procedure returns to "START" in FIG. 2, works in the steps S1-S3 are performed.

The discharging of the hydrogen gas filled in the filling vessel 2 can be performed while the scale has been reset in the step S1 of the calibration for next object apparatus.

With the embodiment shown in the drawings, the measurement housing 1 accommodating the filling vessel 2, and the scale 3 exist in the main body housing 10, which can block wind, rain and direct sun shine at the weight measurements. In addition, blocking wind, rain and direct sun shine prevents sudden changes in temperature, which maintains measurement accuracy of the scale 3. Therefore, without being effected by wind, rain, direct sun shine and temperature changes, accurate measurements become possible.

In addition, with the embodiment shown in the drawings, since the filling vessel 2, the filling gas supply pipe 7 and the filling gas release pipe 12 are disposed in the measurement housing 1 through the supporting members 14, 15 and 8 that are formed with members with heat insulating properties, even when the filling vessel 2, the filling gas supply pipe 7 and the filling gas release pipe 12 become low in temperature by filling the hydrogen gas, which has cooled at −40° C., in the filling vessel 2, effects due to the low temperature and dew are shut off by the supporting members 14, 15, 8 that are formed with the members with heat insulating properties, and the effects do not reach equipment around the scale 3 or the like, and the dew does not condenses thereon.

In addition, with the embodiment shown in the drawings, every time the weight of the filled gas is measured or the measuring position varies, the weight 16 satisfying the traceability of measurements can be mounted to perform the span adjustment that is the adjustment of variation range, so that even when acceleration of gravity, temperature and ambient pressure on the measurement position change, the changes are removed by the span adjustment that is the adjustment of variation range, which has not harmful effects on the measurement accuracy of the scale 3.

In addition to the span adjustment, the measurement housing 1 accommodating the filling vessel 2, the filling gas feeding pipe 7 and the like is mounted on the scale 3 to perform the zero adjustment, which secures necessary and sufficient accuracy for measuring the weight of the filled hydrogen gas.

Then, with the embodiment shown in the drawings, at transportation and storage of the calibration device 100, lock mechanisms 4B of the mounting members 4 act to surely fix the scale 3 on which the measurement housing 1 is mounted to the main body housing 10, which can prevent troubles generated by collision of the scale 3 with other parts.

On the other hand, at the weight measurements, the lock mechanisms 4B are canceled to set free the mounting members 4 from the main body housing 10, which prevents that stresses from deflection or distortion of the main body housing 10, and heat expansion or heat shrinkage by changes in temperature effect on the measurements through the scale 3.

Further, with the embodiment shown in the drawings, when the weight measurements are performed at the calibration, the filling nozzle 21, the dry gas pipe 17 and the various sensors not shown connected to the measurement housing 1 can be separated from the measurement housing 1, which prevents that stresses generated in the filling nozzle 21 and the dry gas pipe 17, or members configuring them act on the scale 3 to vary the results of the weight measurements.

The embodiment shown in the drawings are just example, and a technical field of the present invention is not limited to the embodiment.

For example, in the embodiment shown in the drawings, a calibration device for a hydrogen filling apparatus is explained, but the present invention is applicable to a calibration device for a CNG filling apparatus.

DESCRIPTION OF THE REFERENCE NUMERALS

1 measurement housing
1A weight mounting portion
2 filling vessel
3 scale
3A scale pedestal portion
4 mounting member
4A foot portion
4B lock mechanism
6 receptacle (hydrogen receiving port)
7 filling gas feeding pipe
8 support member
9 check valve
10 main body housing
10A moving means (wheels etc.)
11 filling gas discharging port
12 filling gas discharging pipe
13 gas discharging port
14, 15 support members
16 weight
17 dry gas pipe
18 dew-point instrument
20 hydrogen filling apparatus
21 filling nozzle
100 calibration device
R1, R2, R3 rigid members

What is claimed is:

1. A calibration device comprising:
   a measurement housing accommodating a filling vessel to which a high pressure fuel gas is fed from outside;
   a dew-point instrument coupled to the measurement housing for measuring a dew-point temperature in the measurement housing;
   a dry gas pipe detachably mounted to the measurement housing, the dry gas pipe being sized and structured to carry dry gas to the measurement housing;
   a scale positioned outside of the measurement housing and operative for measuring a weight of a fuel gas fed to the filling vessel;
   a main body housing accommodating the measurement housing and the scale;
   a fluid receiving port mounted on the measurement housing and engageable with a nozzle of a source of high pressure fuel gas from which the high pressure gas is fed; and
   a filling gas supply line extending between the fluid receiving port and the filling vessel.

2. The calibration device as claimed in claim 1, wherein equipment is accommodated in the measurement housing through a member with heat insulating property.

3. The calibration device as claimed in claim 1, wherein at an upper portion of the measurement housing is formed a weight mounting portion for mounting a weight for performing a span adjustment of the scale when place or environment where the measurement is carried out is changed.

4. The calibration device as claimed in claim 2, wherein at an upper portion of the measurement housing is formed a weight mounting portion for mounting a weight for performing a span adjustment of the scale when place or environment where the measurement is carried out is changed.

5. The calibration device as claimed in claim 1, further comprising a check valve coupled to the filling gas supply line for preventing backflow of the high pressure fuel gas within the filling gas supply line.

6. The calibration device as claimed in claim 1, further comprising a filling gas outlet on the measurement housing and fluidly connected to the filling vessel.

7. The calibration device as claimed in claim 6, further comprising a filling gas release pipe extending between the filling vessel and the filling gas outlet.

8. The calibration device as claimed in claim 1, further comprising a gas outlet on the measurement housing for venting dry gas from the measurement housing.

9. The calibration device as claimed in claim 1, further comprising a locking mechanism coupled to the scale and the main body housing for releasably securing the scale to the main body housing.

10. The calibration device as claimed in claim 1, further comprising a plurality of wheels coupled to the main body housing to facilitate movement of the main body housing and the scale accommodated by the main body housing.

11. The calibration device as claimed in claim 1, wherein the dew-point instrument is configured to generating a signal including a measured dew-point temperature to facilitate control over flow of the high pressure fuel gas into the filling vessel based on the measured dew-point temperature.

* * * * *